(12) United States Patent
Ringdahl

(10) Patent No.: US 11,910,956 B2
(45) Date of Patent: Feb. 27, 2024

(54) GRILL GRATE

(71) Applicant: Lynn Ringdahl, Prior Lake, MN (US)

(72) Inventor: Lynn Ringdahl, Prior Lake, MN (US)

( * ) Notice: Subject to any disclaimer, the term of this patent is extended or adjusted under 35 U.S.C. 154(b) by 416 days.

(21) Appl. No.: 17/209,861

(22) Filed: Mar. 23, 2021

(65) Prior Publication Data

US 2022/0304508 A1 Sep. 29, 2022

(51) Int. Cl.
*A47J 37/07* (2006.01)
*A47J 36/02* (2006.01)
*B21D 22/02* (2006.01)
*B22D 25/02* (2006.01)

(52) U.S. Cl.
CPC ......... *A47J 37/0786* (2013.01); *A47J 36/025* (2013.01); *B21D 22/02* (2013.01); *B22D 25/02* (2013.01)

(58) Field of Classification Search
CPC .... A47J 37/0611; A47J 37/0676; A47J 36/32; A47J 37/06; A47J 37/0786; A47J 36/025; B21D 22/02; B22D 25/02
USPC ......... 99/330, 331, 339, 386, 349, 375, 378, 99/400, 425, 445, 446
See application file for complete search history.

(56) References Cited

U.S. PATENT DOCUMENTS

| | | | | |
|---|---|---|---|---|
| 5,347,978 | A * | 9/1994 | Zuran | A47J 37/067 126/41 R |
| 6,314,871 | B1 * | 11/2001 | Holbrook | F24C 15/10 126/41 R |
| 2003/0140799 | A1 * | 7/2003 | Witzel | A47J 37/067 99/447 |
| 2009/0205628 | A1 * | 8/2009 | Lauro | A47J 37/0694 126/25 R |
| 2010/0101558 | A1 * | 4/2010 | Murrin | F23D 14/70 126/39 B |
| 2012/0318149 | A1 * | 12/2012 | Ahmed | A47J 37/0704 99/445 |

* cited by examiner

*Primary Examiner* — Phuong T Nguyen
(74) *Attorney, Agent, or Firm* — Hamre, Schumann, Mueller & Larson, P.C.

(57) ABSTRACT

Grill grates include side walls defining the perimeter of the grill grate and flavor bars, with grease channels between them. The grease channels have continuous, closed bottoms. The flavor bars include dormers. The dormers are configured to direct drippings around the openings, to the grease channels. The dormers can have openings facing substantially towards the grease channels. The grill grates can be formed by methods such as stamping or casting. Stamping the grill grates can include providing metal with flanges and tabs to ensure sufficient material to allow the flavor bars and dormers to be formed, and the grease channels and side walls then sealed through welding. The grill grate can trap drippings in the grease channels while allowing smoke and heat to reach cooked items through the dormers in addition to heat transfer through the material of the flavor bars.

17 Claims, 10 Drawing Sheets

GRILL GRATE

FIELD

This disclosure is directed to a grill grate having a continuous bottom and dormers to allow smoke to reach items being grilled on the grate.

BACKGROUND

Grills typically include open grates. The open grates provide areas of increased heat transfer to the meat at the flavor bars, while smoke passing through the openings between flavor bars impart distinctive flavors to the food being grilled.

However, the open structure allows drippings from grilled food to drip onto coals, gas grill burner assemblies, or the like. Drippings then can be burnt to the interior of the grill, creating a mess and potentially fouling components of gas grill burner assemblies. Further, flammable drippings can cause flare-ups which can burn food and present danger to a grill user.

If left uncleaned, such messes can lead to growth of mold or bacteria, attract animals, go rancid, and/or burn during subsequent cooking, adding off flavors and potentially pathogens to subsequently grilled foods. Also, these messes can accelerate rusting of grill components.

While some trays or pans can be used with grills to catch drippings and facilitate cleaning and prevention of flare-ups, these disrupt the flow of hot air and smoke to the grilled food, lessening the distinctive character of grilled food.

SUMMARY

This disclosure is directed to a grill grate having a continuous bottom and dormers to allow smoke to reach items being grilled on the grate.

Grill grates according to embodiments include one or more side walls and a plurality of flavor bars separated by grease channels. The flavor bars each include one or more dormers. Each of the dormers has at least one opening, the dormer directing drippings around the opening. This arrangement allows drippings from food being cooked on the grill grates to be contained in the grease channels, while the openings allow smoke to reach the meats. After grilling, the grill grates can be removed for easy cleaning of the continuous bottom. This allows the taste of open-grate grilling to be achieved without the typical mess or flare-ups.

In an embodiment, a grill grate includes a plurality of flavor bars and one or more grease channels disposed between flavor bars of the plurality of flavor bars. Each of the plurality of flavor bars includes one or more dormers formed thereon. Each dormer includes an opening. The dormer is configured to direct drippings around the opening towards the grease channels. The grease channels form at least a portion of one or more basins configured to receive the drippings.

In an embodiment, each of the openings faces substantially towards one of the one or more grease channels.

In an embodiment, the grill grate comprises one or more side walls, and the one or more basins are defined at least in part by the side walls.

In an embodiment, each of the grease channels is closed at a first end by a first end wall and each of the grease channels is closed at a second end, opposite the first end, by a second end wall, and each of the grease channels forms one of the one or more basins.

In an embodiment, each of the openings is trapezoidal in shape.

In an embodiment, the grill grate comprises stainless steel.

In an embodiment, each of the plurality of flavor bars includes a relief opening at each end of said flavor bar.

In an embodiment, the dormers of one of the plurality of flavor bars are offset along the length of the flavor bar from a position of the dormers of each adjacent flavor bar of the plurality of flavor bars.

In an embodiment, the grill grate is part of a grill.

In an embodiment, a method of manufacturing the grill grate includes providing a metal sheet including a plurality of flanges spaced apart from one another along the perimeter of the metal sheet, stamping the metal sheet to form the flavor bars and the dormers, and welding at least two of the plurality of flanges together to form at least part of the one or more side walls. In an embodiment, each of the plurality of flanges includes a tab configured to extend over another of the plurality of flanges after the metal sheet has been formed.

In an embodiment, a method of manufacturing the grill grate includes casting the grill grate. In an embodiment, the grill grate is cast aluminum. In an embodiment, this method of manufacturing further includes coating the grill grate with a non-stick coating.

DRAWINGS

DETAILED DESCRIPTION

This disclosure is directed to a grill grate having a continuous bottom and dormers to allow smoke to reach items being grilled on the grate.

Figure 1:
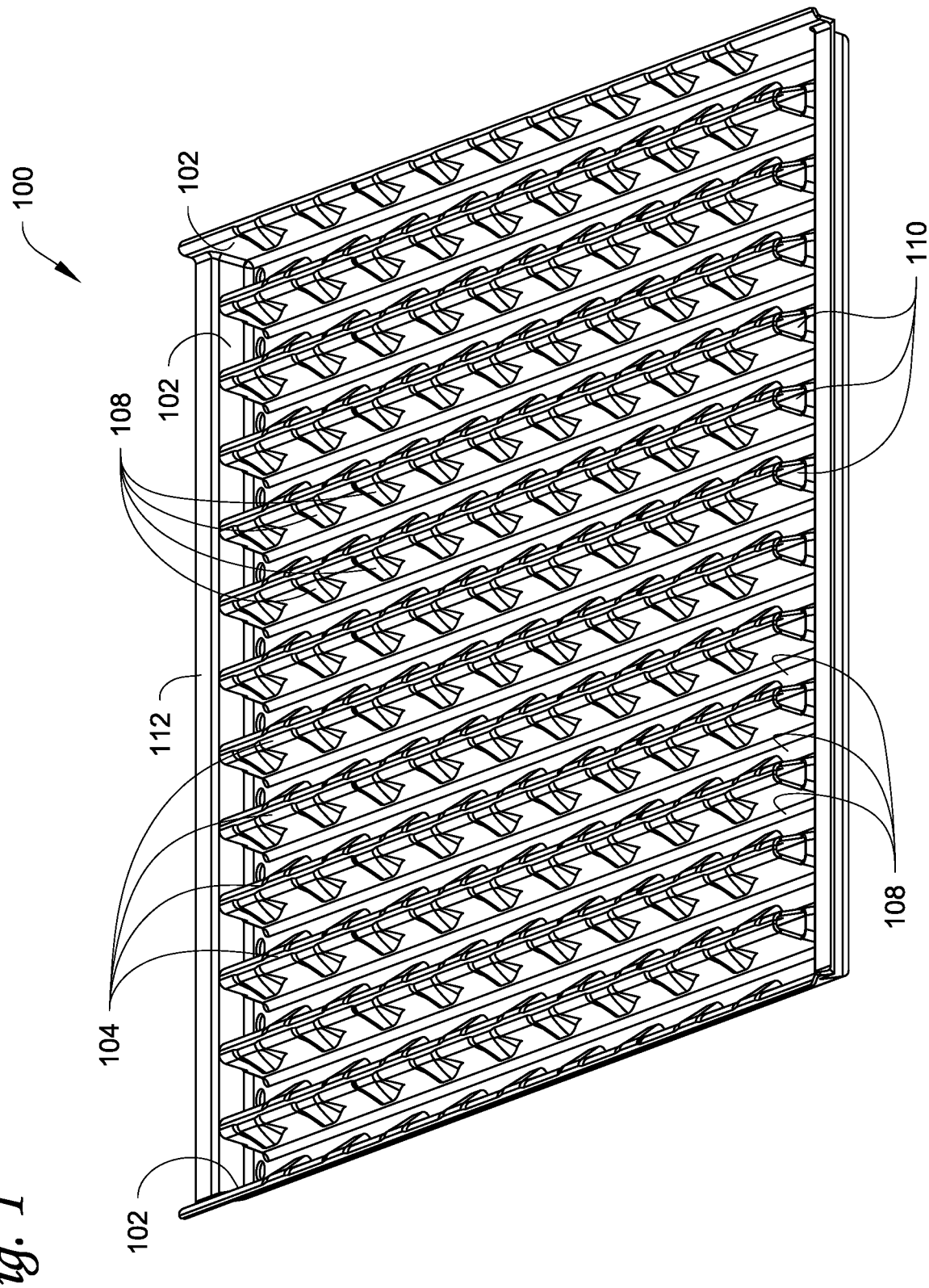
FIG. 1 shows a perspective view of a grill grate according to an embodiment.

FIG. 1 shows a perspective view of a grill grate according to an embodiment. Grill grate 100 includes side walls 102, flavor bars 104, and grease channels 106. Each of the flavor bars 104 includes one or more dormers 108. Optionally, an opening 110 can be at an end of at least some of the flavor bars 104.

Grill grate 100 can include any one or more suitable materials for a grill grate, providing sufficient heat resistance and heat transfer properties to allow cooking at typical temperatures for charcoal, gas, or pellet grills or over fire pits. Grill grate 100 can include one or more metals. In an embodiment, the one or more metals includes stainless steel. In an embodiment, the one or more metals includes aluminum. In an embodiment, grill grate 100 can further include a coating, such as, for example, any suitable non-stick coating. In an embodiment, the non-stick coating is included when the grill grate 100 includes aluminum. The non-stick material can be selected for compatibility with the material used for grill grate 100. The non-stick material can be, as non-limiting examples, polytetrafluoroethylene (PTFE) or ceramic coatings. In an embodiment, grill grate 100 can include cast iron.

Grill grate 100 is shaped and sized to be insertable into a grill, for example to be supported by grill grate supports included in the grill. Typical suitable shapes include rectangular and circular shapes for use with grills of corresponding shapes. In an embodiment, the grill grate 100 can be placed within another heat source or cooking device such as an oven, convection oven, air fryer, pressure cooker, or any other suitable cooking device. Grill grate 100 can be sized accordingly to be accommodated within the selected cooking device. The perimeter of grill grate 100 is defined by the side walls 102. Side walls 102 extend vertically to a point above the bottoms of grease channels 106, such that they can prevent liquids in grease channels 106 from escaping the grill grate 100, for example by running out the sides. In the embodiment shown in FIG. 1, four side walls 102 are provided defining a rectangular shape for grill grate 100. In an embodiment, side walls 102 can be provided between the ends of flavor bars 104, at each end of each of the grease channels 106. This can allow these side walls 102 to retain liquid in each of those grease channels 106.

Flavor bars 104 are configured to provide support to items being cooked on the grill grate 100 and to provide heat transfer at the points of contact with the items being cooked. Flavor bars 104 extend vertically such that they include peaks above the grease channels 106. In an embodiment, the height of the flavor bars 104 is the same as the height of side walls 102. In an embodiment, the height of the peaks of flavor bars 104 above an upper surface of grease channels 106 is between one half-inch and two inches. In an embodiment, the height of peaks of flavor bars 104 above an upper surface of the grease channels 106 is approximately one inch. Flavor bars 104 can each be parallel to one another. Flavor bars 104 can be generally triangular or trapezoidal in shape. Flavor bars 104 can include side walls and a curved or flat upper surface. Flavor bars 104 can extend some or all of a distance across the grill grate 100 in a particular direction. In an embodiment, flavor bars 104 do not extend the full distance across grill grate 100. In this embodiment, spaces between the ends of flavor bars 104 and the perimeter of the grill grate 100 can be part of grease channels 106 or otherwise configured to receive grease and drippings during use of grill grate 100.

The flavor bars 104 are separated by grease channels 106. The grease channels 106 include a continuous, closed bottom. In an embodiment, grease channels 106 do not include any openings that could allow drippings to pass through the grease channels 106. Upper surfaces of the grease channels 106 can include the lowest points of the upper surface of grill grate 100.

Dormers 108 are formed on flavor bars 104. The dormers 108 project outwards with respect to the side walls of flavor bars 104. The dormers 108 include openings. The openings are configured to allow fluids such as gases to pass from below grill grate 100 to an upper side of grill grate 100. The dormers 108 are shaped to direct drippings from food on top of flavor bars 104 such that the drippings cannot enter the openings. In an embodiment, each of the dormers 108 include one or more sloped walls surrounding the opening. In an embodiment, the openings face substantially towards the grease channel 106 adjacent the flavor bar 104, on the side of flavor bar 104 including the dormer 108. In an embodiment, the openings are generally trapezoidal in shape. The openings of dormers 108 can be spaced apart from the grease channels 106 such that drippings in the grease channels 106 will not overflow into openings in the dormers 108. This distance can be based on estimates of the quantity of drippings likely to be produced in one grilling session using grill grate 100. In an embodiment, the vertical distance between an upper surface of a grease channel 106 and an opening of a dormer 108 facing that grease channel 106 can be between approximately one quarter-inch and approximately one inch. In the embodiment shown in FIG. 1, the dormers are positioned such that dormers 108 on facing sides of adjacent flavor bars 104 are aligned with one another with respect to the length direction of the flavor bars 104. In an embodiment, the dormers 108 can be staggered such that the dormers 108 on facing sides of adjacent flavor bars 104 are offset with respect to one another along the length directions of the flavor bars 104.

Optionally, the ends of the flavor bars 104 can include openings 110. Openings 110 can be openings included in the design to facilitate manufacturing, for example to avoid the need to stamp a three-dimensional corner. Openings 110 can be limited to the ends of flavor bars 104 where food will not be placed during use of the grill grate 100. Openings 110 can have lowest open points at or above the vertical position of the openings included in dormers 108. Openings 110 can further allow users to visually confirm the presence of flame in the grill or fire pit that grill grate 100 is being used with.

Grill grate 100 can further include support flanges 112. Support flanges 112 are projections at sides or ends of the grill grate 100 that are configured to contact a body of a grill such that the grill grate 100 is supported over a heat source of the grill such as a propane burner, a charcoal compartment, or the like. Support flanges 112 can be provided on opposing sides or ends of the grill grate 100. In an embodiment, support flanges 112 can project sufficiently to be used as handles for placing or removing grill grate 100 on a fire pit.

Figure 2:
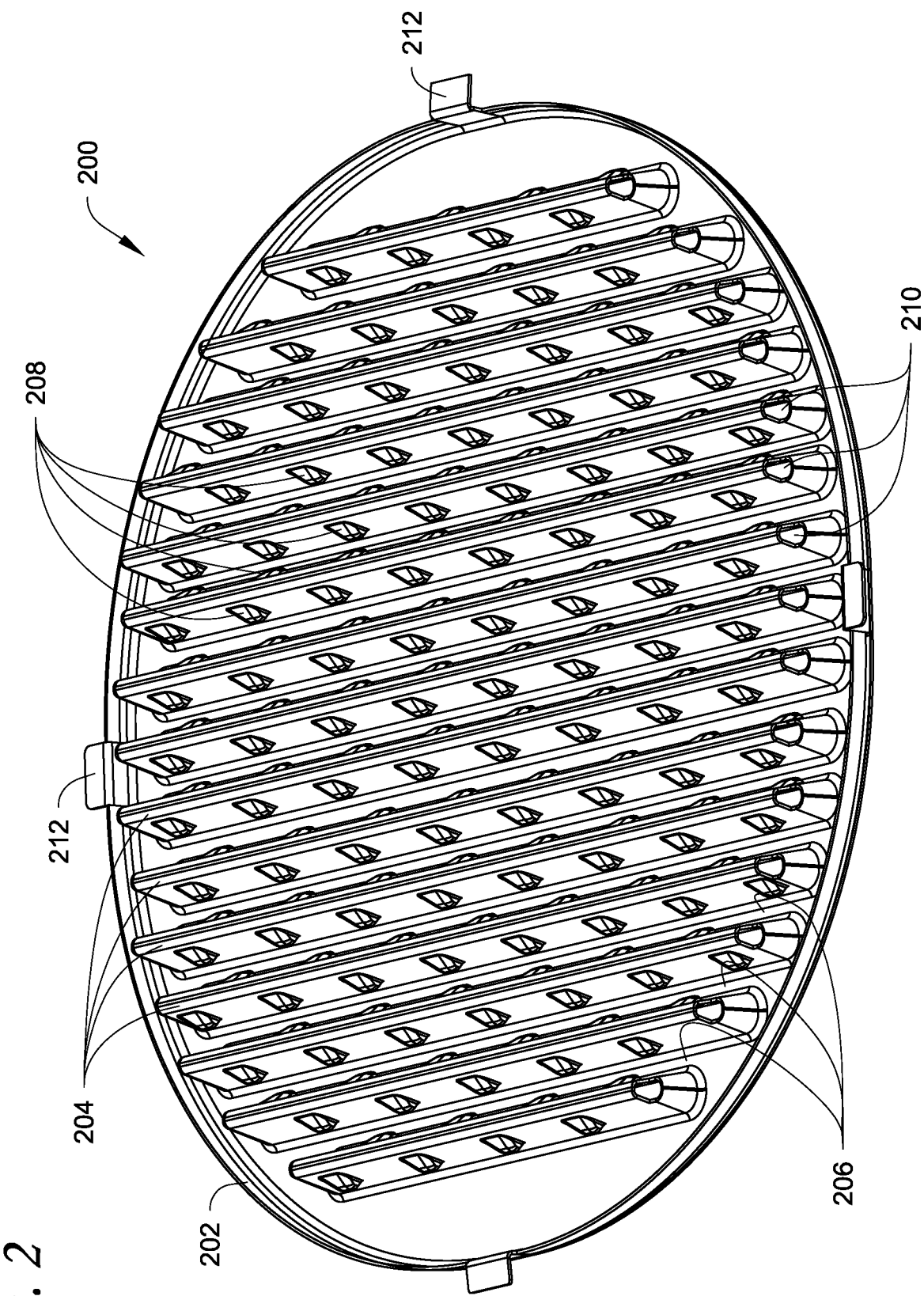
FIG. 2 shows a perspective view of a grill grate according to an embodiment.

FIG. 2 shows a perspective view of a grill grate according to an embodiment. Grill grate 200 includes side wall 202, flavor bars 204, grease channels 206, dormers 208, and openings 210. In the embodiment shown in FIG. 2, grill grate 200 has a circular perimeter defined by one circular side wall 202. In embodiments, grill grate 200 could be elongated along an axis to produce an oval or elliptical grill grate. Flavor bars 204 are similar to flavor bars 104 described above, with the length of flavor bars 204 varying depending on their position within the circular shape of grill grate 200, such that the lengths of each of the flavor bars 204 are consistent with this circular shape and do not extend beyond the side wall 202. Grease channels 206 correspondingly vary in length, consistent with the different lengths of flavor bars 204 and the circular side wall 202, but are otherwise similar to grease channels 106 described above. Dormers 208 are included along flavor bars 204 as dormers 108 are included along flavor bars 104 as described above and shown herein.

Grill grate 200 can include support flanges 212 distributed radially around the circular shape of the grill grate 200. Support flanges 212 are configured to contact a grill such that grill grate 200 is supported over a heat source of the grill such as a propane burner, a charcoal compartment, or the like. In an embodiment, the grill grate 200 can be placed within another heat source or cooking device such as an oven, convection oven, air fryer, pressure cooker, or any other suitable cooking device. Grill grate 200 can be sized accordingly to be accommodated within the selected cooking device. In an embodiment, four support flanges 212 are provided around the grill, each radially spaced apart from the other support flanges by 90 degrees. In embodiments, grill grate 200 can instead be supported by additional grating or other support within the grill or fire pit. In an embodiment, support flanges 212 can extend such that they can be used as handles for placing, removing, or otherwise moving the grill grate 200.

Figure 3:
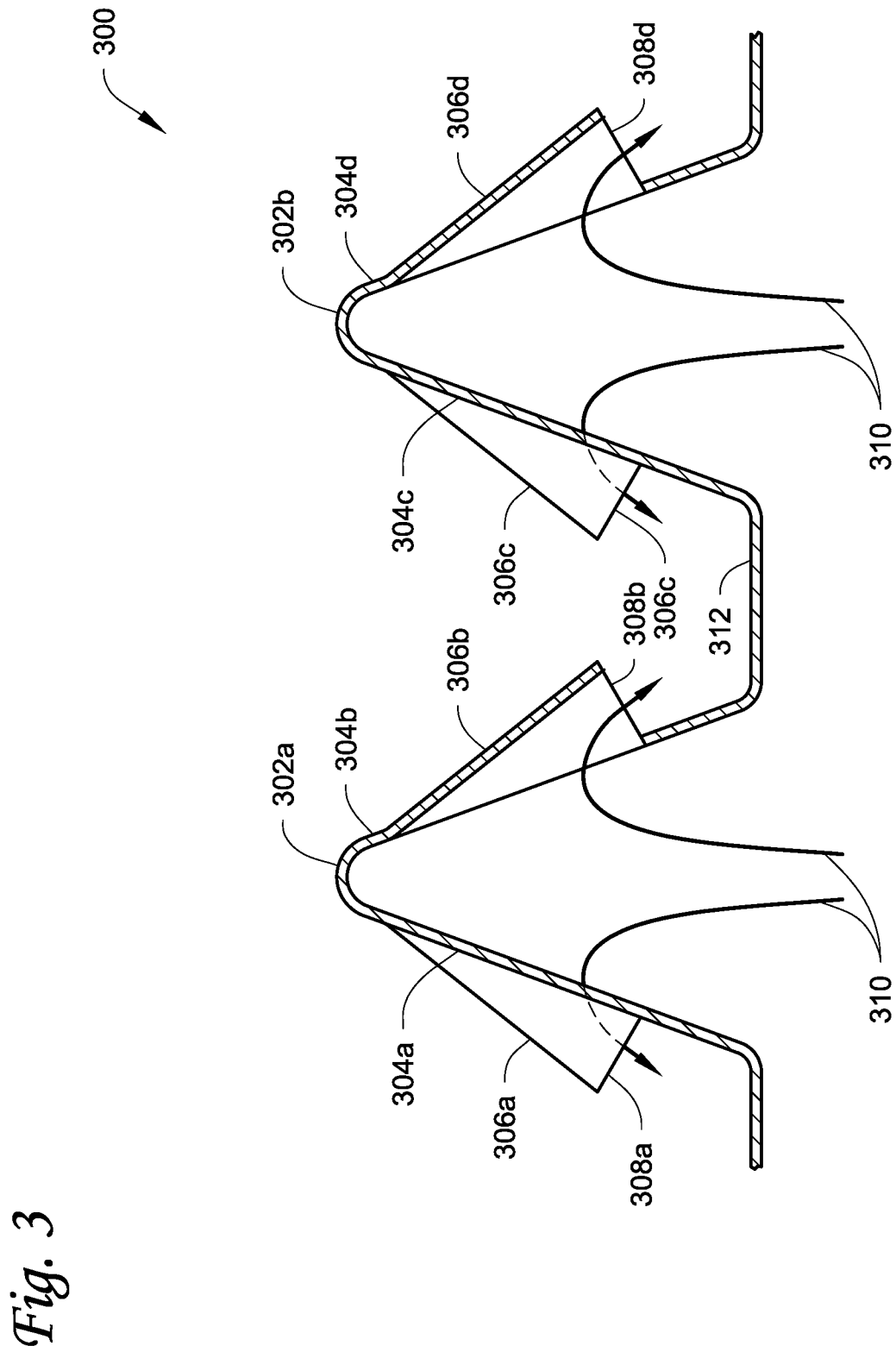
FIG. 3 shows a sectional view of part of a grill grate according to an embodiment.

FIG. 3 shows a sectional view of part of a grill grate according to an embodiment. Portion 300 of a grill grate shown in FIG. 3 includes two flavor bars, 302a and 302b. Flavor bar 302a includes first side wall 304a and second side wall 304b. Flavor bar 302b includes first side wall 304c and second side wall 304d. Second side wall 304b of flavor bar 302a faces first side wall 302c of flavor bar 302b. Dormers 306a-d are respectively provided on each of side walls 304a-d. Openings 308a-d are respectively provided on each of dormers 306a-d. Gas flows 310 can pass from below the portion 300 of the grill grate through the openings 308a-d, reaching the upper side of portion 300 of the grill grate. Grease channel 312 is between flavor bars 302a and 302b.

Flavor bars 302a and 302b are two adjacent flavor bars of a grill grate. The flavor bars can support food as it is being cooked on the grill grate. The flavor bars project above the grease channel 312, with the side walls 304a-d extending upwards from grease channel 312 towards the tops of the respective flavor bars 302a and 302b. The flavor bars can be flavor bars such as the flavor bars 104 and 204 described above and shown in FIGS. 1 and 2.

Dormers 306a-d project outwards from side walls 304a-d. Dormers 306a-d can include sloped sides surrounding openings 308a-d. The sloped sides can direct liquid from above the dormers 306a-d, such as drippings from food that is being cooked on flavor bars 302a and 302b, around the openings 308a-d and towards grease channel 312. The sloped sides can prevent liquid from above the dormers 306a-d from entering the openings 308a-d. Openings 308a-d can be oriented such that they substantially face towards the nearest grease channels, for example, openings 308b and 308c can substantially face towards grease channel 312. In an embodiment, openings 308a-d can be trapezoidal in shape when viewed in plane with the opening.

Grease channel 312, combined with the portions of side walls 304a-d below openings 308a-d provide at least part of a basin in which drippings from food on flavor bars 302a and 302b can be collected, without allowing the drippings to exit the grill grate or contact the grill that the grill grate is used with. After grilling, the grill grate can be removed and the drippings dumped or otherwise cleaned out.

Gas flows 310 can include, for example, smoke and/or heated air produced by a grill heat source. The grill heat source can be any suitable grill heat source, such as charcoal, gas burners such as propane gas burners, wood, wood pellet, electrically heated smokers, or the like. The gas flows begin underneath the grill grate including portion 300, for example due to the placement of the grill grate into supports provided on the grill including the grill heat source. The gas flows are obstructed by portions of continuous material in the grill grate, such as the grease channel 312, and side walls 304a-d and the tops of the flavor bars 302a and 302b. The gas flows 310 can pass through openings 308a-d, being distributed to an upper side of the grill grate, above the grease channel 312 but below the tops of flavor bars 302a and 302b. From there, the gas flows 310 can then contact food resting on top of the flavor bars 302a and 302b, for example providing additional heat and/or imparting flavor to the food when it is grilled using the grill grate. Flavor bars 302a and 302b can be heated by the grill as in standard grill grates, and transfer heat to food items placed thereon. This can result in sufficient heat transfer and high enough temperatures to provide grill marks on food being cooked thereon.

In the sectional view of FIG. 3, dormers 306a and 306c are recessed into the page with respect to the viewer such that their exteriors are visible, and dormers 306b and 306d are cut along the section line taken for the sectional view of FIG. 3. Dormers 306b and 306c, on facing side walls 304b and 306c of the adjacent flavor bars 302a and 302b are offset from one another along the length direction of the flavor bars 302a and 302b, perpendicular to the plane along which the section is taken for the view of FIG. 3.

Figure 4A:
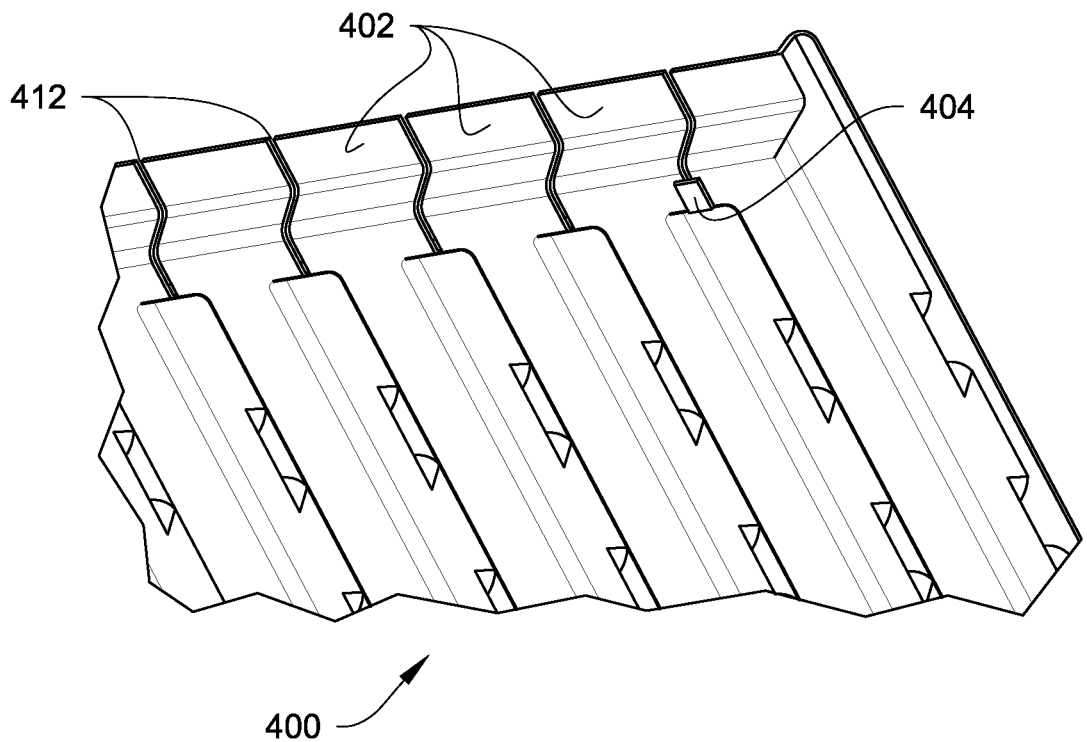
FIG. 4A shows a perspective view of part of a bottom side of a grill grate according to an embodiment.

FIG. 4A shows a perspective view of part of a bottom side of a grill grate according to an embodiment. In the view of FIG. 4A, manufacturing flanges 402 can be seen at an end of grill grate 400. Tab 404 extends from one of the manufacturing flanges 402 to overlap with another of the manufacturing flanges 402 to provide a welding point used during manufacturing of the grill grate 400.

The manufacturing flanges 402 can be included in portions of a metal sheet used to form the grill grate 400 that correspond to the grease channels 410 that will be formed. The manufacturing flanges 402 can be projections, spaced apart from one another by approximately the width of metal that will be used when forming flavor bars and dormers of the grill grate 400 when manufactured by a stamping process. When the grill grate 400 is formed, the manufacturing flanges 402 can be formed into ends of the grease channels 410 to provide basins that can hold drippings.

In an embodiment, when the grill grate is formed, small gaps 412 may exist between the manufacturing flanges 402. The gaps 412 can be sealed, for example through welding, such that drippings in grease channels 410 cannot escape the grill grate 400 at those gaps 412. In an embodiment, one or more of the manufacturing flanges 402 can include a tab 404. The tab 404 can extend from one of the manufacturing flanges 402 towards another and be positioned such that when the grill grate 400 is formed, tab 404 will extend over a portion of that other manufacturing flange 402. The extension of tab 404 over adjacent manufacturing flange 402 can reduce leakage at the gap 412 between those manufacturing flanges 402 and/or provide a welding point for sealing such a gap 412.

Figure 4B:
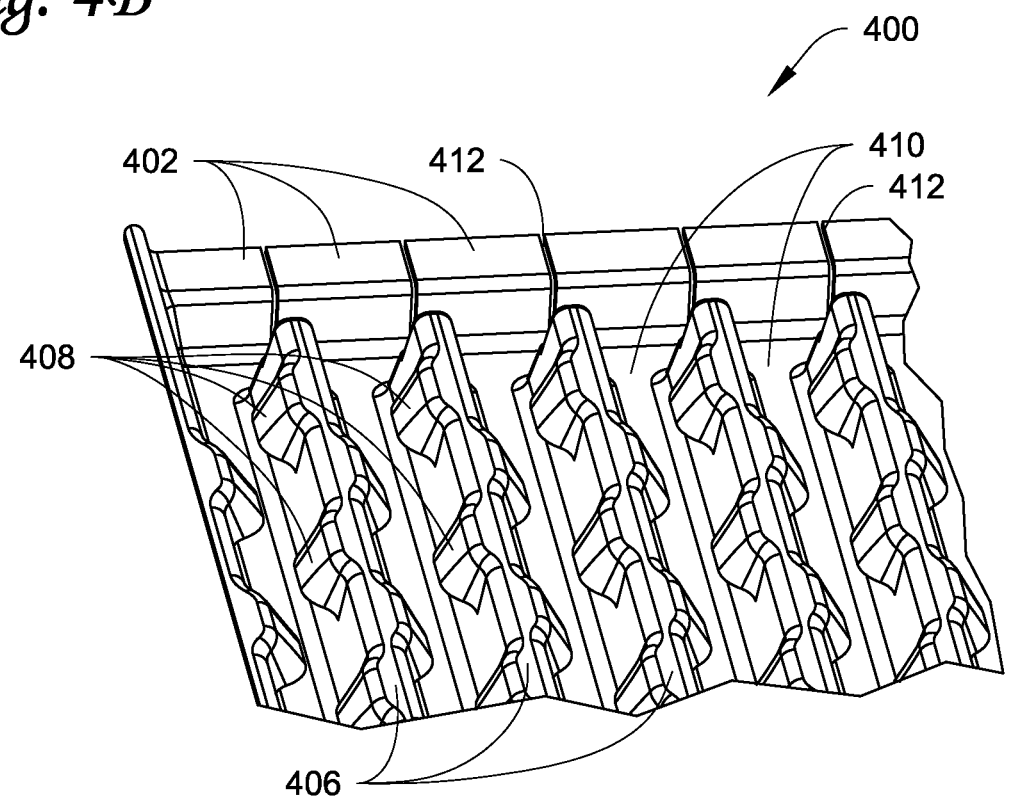
FIG. 4B shows a perspective view of part of an upper side of a grill grate according to an embodiment.

FIG. 4B shows a perspective view of part of an upper side of a grill grate according to an embodiment. Manufacturing tabs 402 and gaps 412 between them can be seen in the view of FIG. 4B. The manufacturing tabs 402 forming the ends of grease channels 410 is visible in this view. Further, the flavor bars 406 and dormers 408 can be seen in FIG. 4B. The flavor bars 406 and dormers 408 can be shaped by stamping. The material drawn to form the flavor bars 406 and dormers 408 during stamping to form grill grate 400 can be portions of a metal sheet that are located between portions of the metal sheet that include the manufacturing tabs 402. In the embodiment shown in FIG. 4B, the flavor bars have a flat top. In the embodiment shown in FIG. 4B a top of each of the dormers 408 is continuous with the top of the flavor bars 408, with the remainder of each of the dormers 408 protruding from the side walls of the flavor bar 406 that it is disposed on. The flavor bars 406 can include openings at their ends such as the openings 110 shown in FIG. 1. The manufacturing tabs 402 can be used as the flanges 112 or 212 as described above and shown in FIGS. 1 and 2.

Figure 5:
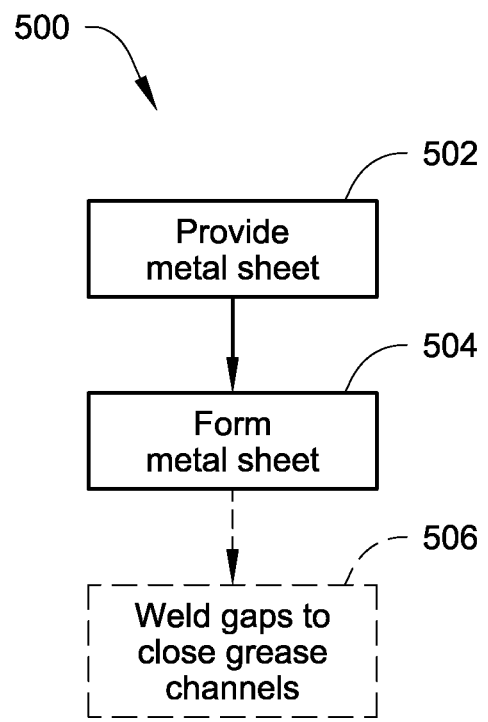
FIG. 5 shows a flow chart of a method manufacturing a grill grate according to an embodiment.

FIG. 5 shows a flow chart of a method manufacturing a grill grate according to an embodiment. Method 500 includes providing sheet metal 502, stamping the metal sheet 504, and welding gaps to close grease channels of the grill grate 506.

Sheet metal is provided at 502. The sheet metal can be any suitable sheet of metal for manufacture of the grill grate. The sheet metal can be, for example, aluminum or stainless steel. The thickness of the sheet metal can be any suitable thickness for use as the grill grate. The thickness of the sheet metal can be selected based on the particular metal being used for the grill grate.

The sheet metal provided at 502 can include one or more features to allow for the manufacturability of the grill grate. The one or more features can include, for example, the manufacturing flanges 402 and tabs 404 shown in FIGS. 4A and 4B and described above. The flanges or tabs can be separated from one another by other portions of the metal sheet, such as spaces that will be formed into certain parts of the grill grate such as the flavor bars and/or dormers when the sheet metal is formed at 504. In an embodiment, providing the sheet metal at 502 can include cutting or otherwise modifying a geometry of sheet metal to include these one or more features. In an embodiment, the sheet metal can be selected such that a coating can be subsequently applied to the grill grate. For example, the sheet metal can be a material such as ASTM A424 steel or any other suitable steel for application of an enamel. In an embodiment, the thickness or other properties of the sheet metal can be selected based on eventual application of a coating to the grill grate, for example selecting a thinner material based on eventual application of the coating.

The sheet metal is formed at 504. The stamping involves stamping the sheet metal provided at 502 one or more times between one or more tools and one or more dies to provide the three-dimensional shape of the grill grate. The three-dimensional shape of the grill grate can be any embodiment of a grill grate described herein. In embodiments, one or more stamping steps can be used in the forming at 504 to define different features. When multiple stamping steps are performed, different stamping sets can use different tooling. In an embodiment, the stamping at 504 includes using a turret punch or stamping machine to perform a first forming step, then using a brake machine or a stamping machine to perform a second forming step. The second forming step can include forming of features such as, for example, end walls 608, 610 at the ends of grease channels 604, as described below and shown in FIG. 6.

Optionally, such as when the three-dimensional shape of the grill grate produced by the stamping at 504 includes gaps or openings that could allow drippings to escape, the grill grate can then be welded to seal the grease channels at 506. The welding can be, for example, welding at each of a number of straight gaps such as gaps 412 shown in FIGS. 4A and 4B and described above, or any other suitable welding point such as at tabs 404 shown in FIG. 4A and described above.

Optionally, the resulting grill grate can have a coating applied, such as a non-stick coating, a ceramic, an enamel such as a porcelain enamel, or the like. The coating can be applied to some or all surfaces of the grill grate.

In an embodiment, grill grates according to embodiments can be manufactured by casting instead. In an embodiment, a grill grate made by casting includes aluminum or iron. In an embodiment, an aluminum or iron grill grate is then coated with a non-stick material. The non-stick material can be any suitable non-stick material capable of adhering to aluminum and that is durable and safe for use with food at temperatures experienced during the grilling of food. The non-stick material can be selected based on temperatures for a specific type of grilling that the product is intended to be used for, such as a grill grate for a propane grill including a non-stick material that is durable and safe for use with food at temperatures typical to propane burner grills. The non-stick material can be selected for compatibility with the material used for the grill grate, such as any grill grate described herein. The non-stick material can be, as non-limiting examples, polytetrafluoroethylene (PTFE) or ceramic coatings such as porcelain or enamel.

Figure 6:
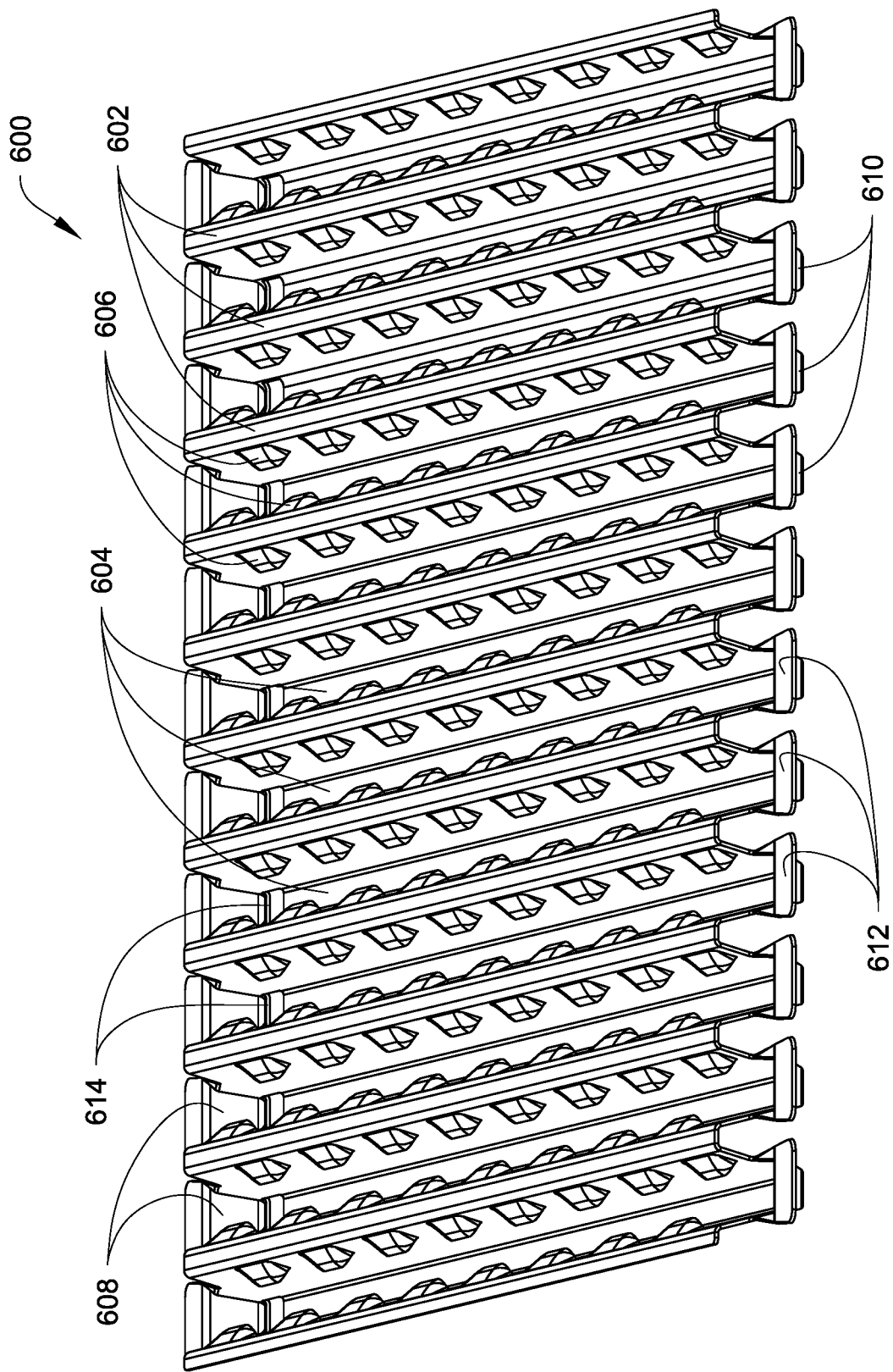
FIG. 6 shows a perspective view of a grill grate according to an embodiment.

FIG. 6 shows a perspective view of a grill grate according to an embodiment. Grill grate 600 includes a plurality of flavor bars 602 separated by grease channels 604. Dormers 606 are provided on the sides of flavor bars 602. Each of grease channels 604 includes a first end wall 608 at a first end of the grease channel 604, and a second end wall 610 at an opposite end of the grease channel 604. The grill grate 600 can further include support flanges 612.

Grill grate 600 can include any one or more suitable materials for a grill grate, providing sufficient heat resistance and heat transfer properties to allow cooking at typical temperatures for charcoal or gas grilling. Grill grate 600 can include one or more metals. In an embodiment, the one or more metals includes stainless steel. In an embodiment, the one or more metals includes aluminum. In an embodiment, grill grate 600 can further include a coating, such as, for example, any suitable non-stick coating. In an embodiment, the non-stick coating is included when the grill grate 600 includes aluminum. The non-stick material can be selected for compatibility with the material used for grill grate 600. The non-stick material can be, as non-limiting examples, polytetrafluoroethylene (PTFE) or ceramic coatings. Grill grate 600 is shaped and sized to be insertable into a grill, for example to be supported by grill grate supports included in the grill. Typical suitable shapes include rectangular shapes such as that shown in FIG. 6, and circular shapes such as that shown in FIG. 7 and described below, for use with grills of corresponding shapes.

Flavor bars 602 are configured to provide support to items being cooked on the grill grate 600 and to provide heat transfer at the points of contact with the items being cooked. Flavor bars 602 extend vertically such that they include peaks above the grease channels 604. In an embodiment, the height of the peaks of flavor bars 602 above an upper surface of grease channels 604 is between one half-inch and two inches. In an embodiment, the height of peaks of flavor bars 602 above an upper surface of the grease channels 604 is approximately one inch. Flavor bars 602 can each be parallel to one another. Flavor bars 602 can be generally triangular or trapezoidal in shape. Flavor bars 602 can include side walls and a curved or flat upper surface.

Dormers 606 can be formed on flavor bars 602. The dormers 606 project outwards with respect to the side walls of flavor bars 602. The dormers 606 include openings. The openings are configured to allow fluids to pass from below grill grate 600 to an upper side of grill grate 600. The dormers 606 are shaped to direct drippings from food on top of flavor bars 602 such that the drippings cannot enter the openings. In an embodiment, each of the dormers 606 include one or more sloped walls surrounding the opening. In an embodiment, the openings face substantially towards the grease channel 604 adjacent the flavor bar 602, on the side of flavor bar 602 including the dormer 606. In an embodiment, the openings are generally trapezoidal in shape. The openings of dormers 606 can be spaced apart from the grease channels 604 such that drippings in the grease channels 604 will not overflow into openings in the dormers 606. This distance can be based on estimates of the quantity of drippings likely to be produced in one grilling session using grill grate 600. In an embodiment, the vertical distance between an upper surface of a grease channel 604 and an opening of a dormer 606 facing that grease channel 604 can be between approximately one quarter-inch and approximately one inch. In the embodiment shown in FIG. 1, the dormers are positioned such that dormers 606 on facing sides of adjacent flavor bars 602 are aligned with one another with respect to the length direction of the flavor bars 602. In an embodiment, the dormers 606 can be staggered such that the dormers 606 on facing sides of adjacent flavor bars 602 are offset with respect to one another along the length directions of the flavor bars 602.

Grease channels 604 are each provided between two flavor bars 602. The grease channels 604 each include a continuous, closed bottom surrounded by the sides of the adjacent flavor bars 602, first end wall 608, and second end wall 610. In an embodiment, the grease channel 604 and its respective first end wall 608 and second end wall 610 can be formed such that they provide a continuous basin with no openings by which grease could escape. This can be provided by, for example, the features being formed of a continuous piece, welds being provided at joints, or any other suitable structure to prevent grease from escaping the grease channel 604. In an embodiment, grease channels 604 do not include any openings that could allow drippings to pass through the grease channels 604. In the embodiment shown in FIG. 6, each grease channel forms its own individual, independent basin to receive grease and drippings from foods being cooked on grill grate 600. Optionally, as shown in FIG. 6, the grease channels 604 can include openings 614 at an end, such that each grease channel can instead permit grease to escape, for example to drop into a grease trap such as those shown in FIGS. 8 and 9 and discussed in detail below. In an embodiment, the grease channels 604 may slope downwards as they extend to openings 614.

Support flanges 612 can be included in grill grate 600. Support flanges 612 are projections at sides or ends of the grill grate 600 that are configured to contact a body of a grill such that the grill grate 600 is supported over a heat source of the grill such as a propane burner, a charcoal compartment, or the like. In the embodiment shown in FIG. 6, support flanges 612 each extend from one of the first or second end walls 608, 610, away from the grease channel 604 defined in part by that one of the first or second end walls 608, 610.

Figure 7:
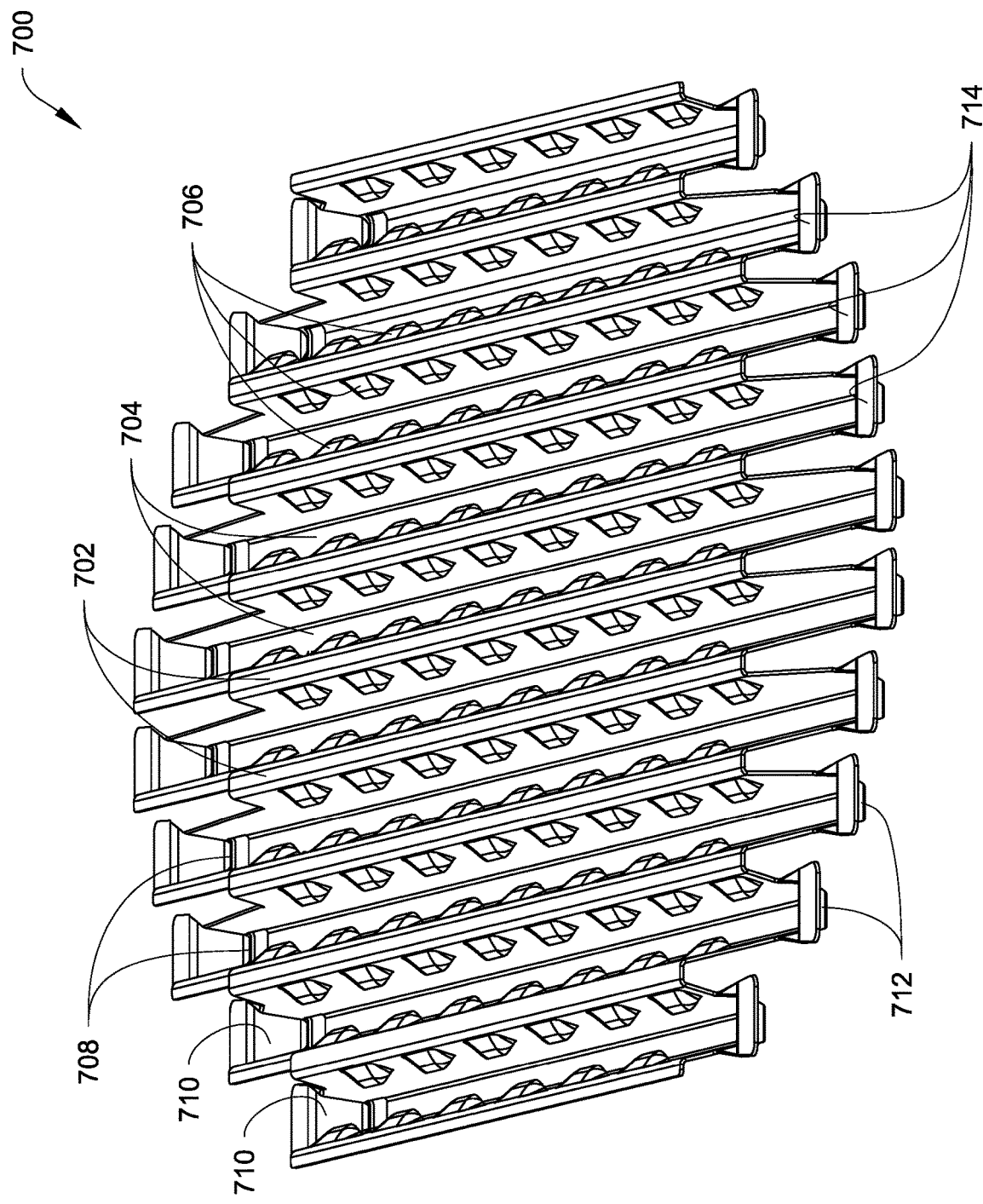
FIG. 7 shows a perspective view of a grill grate according to an embodiment.

FIG. 7 shows a perspective view of a grill grate according to an embodiment. Grill grate 700 includes a plurality of flavor bars 702 separated by grease channels 704. Dormers 706 and openings 708 are provided on the sides of flavor bars 702. Each of grease channels 704 includes a first end wall 710 at a first end of the grease channel 704, and a second end wall 712 at an opposite end of the grease channel 704. The grill grate 700 can further include support flanges 714. In the embodiment shown in FIG. 7, at least some of the flavor bars 702 and/or grease channels 704 can be of differing lengths such that the grill grate 700 has a shape configured to fit on or within a circular grill. In an embodiment, the sides of flavor bars 702 differ from one another such that adjacent grease channels 704 are of differing lengths.

Figure 8:
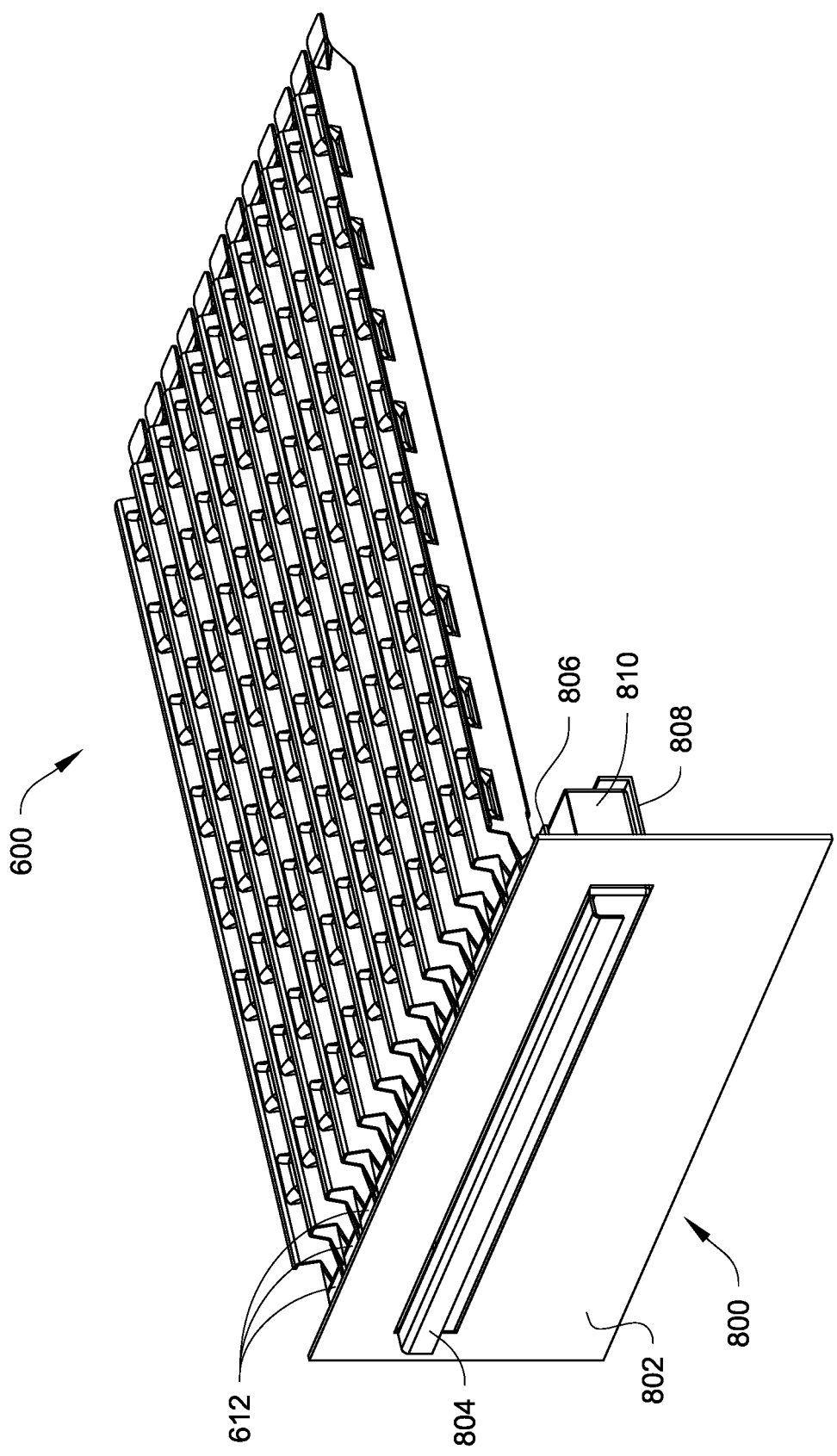
FIG. 8 shows the grill grate of FIG. 6 with a grease trap according to an embodiment.

FIG. 8 shows the grill grate of FIG. 6 with a grease trap according to an embodiment. Grease trap assembly 800 includes a wall 802. A handle 804 is provided on a first side of wall 802. In an embodiment, handle 804 can be used to manipulate grease trap assembly 800 such that it can be removed from the grill for cleaning. In an embodiment, handle 804 is connected to grease trap 810 directly, with handle 804 extending through an opening in wall 802, with the opening sized such that the handle 804 can be used to remove grease trap 810 through said opening in wall 802. A grate support flange 806 is provided on a second side of wall 802, opposite the side including handle 804. The grease trap assembly also includes a grease trap support 808 extending from the second side of wall 802, with a grease trap 810 configured to rest on the grease trap support. The grease trap assembly 800 is configured to replace some or all of a wall of a grill, with handle 804 facing outwards, and the grate support flange 806 facing the inside of the grill. In the embodiment shown in FIG. 8, the grease trap assembly 800 is configured to replace a straight side wall of a square or rectangular grill, such as the wall facing a user during typical use of the grill. In embodiments, the grease trap assembly can be configured to fit in other types of grills, such as having a curve to each of the elements suitable for the grease trap assembly 800 to replace a segment of a round grill, or any other such suitable modification based on the shape of the grill grease trap assembly 800 is to be used with. The grate support flange 806 is a flange positioned and sized such that it can support at least a portion of a grill grate such as grill grate 600 by allowing the support flanges 612 of grill grate 600 to rest on grate support flange 806 when the grease trap assembly 800 is installed into a grill. The grease trap support 808 is one or more mechanical features provided on wall 802 to fix the grease trap 810 in place or provide a connection point for grease trap 810. In the embodiment shown in FIG. 8, the grease trap support 808 is a flange configured to allow the grease trap 810 to rest on it. Alternatively, grease trap support 808 can be arms extending from wall 802, engagement features such as hooks or tabs configured to engage with the grease trap 810, or any other suitable feature. In an embodiment, the grease trap support 808 can include a depression configured to receive the grease trap 810. In an embodiment, grease trap 810 can be fixed to grease trap support 808, for example by a weld or any other method of fixation that is suitable for the temperatures that may be experienced by a wall of a grill. Grease trap 810 has an open upper side and defines an internal volume that can receive drippings leaving grill grate 600. Grease trap assembly 800 can be configured such that grease trap 810 is below openings 614 of the grill grate 600 when the grease trap assembly 800 is installed in a grill and the support flanges 612 of grill grate 600 are resting on grate support flanges 806.

Figure 9:
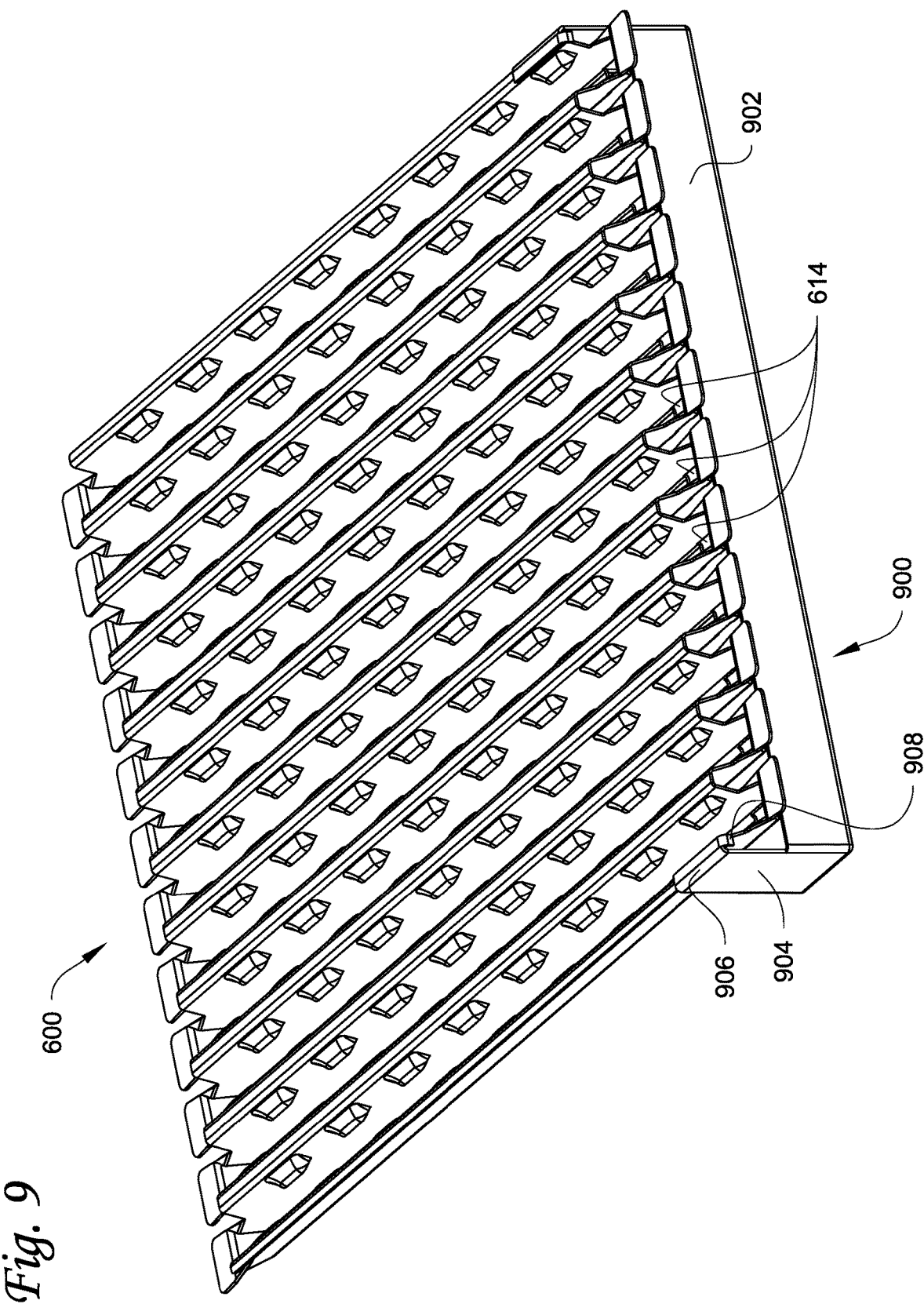
FIG. 9 shows a grill grate including a grease trap according to an embodiment.

FIG. 9 shows the grill grate of FIG. 6 and a grease trap according to an embodiment. Grease trap 900 includes a grease trap body 902, retention arms 904, and hooks 906 at the ends of retention arms 904. Grease trap body 902 defines a has an open upper side and defines an internal volume that can receive and hold drippings leaving grill grate 600 by way of openings 614. Retention arms 904 extend upwards from the grease trap body such that hooks 906 can be positioned to grip the grill grate 600, for example, such that the hooks 906 are provided on either side of the grill grate 600. Hooks 906 are mechanical structures configured to contact the grill grate 600 such that the grease trap 900 can be suspended from the grill grate 600 when the grill grate 600 is installed on a grill. Hooks 906 can include a stop 908 to ensure that the grease trap 900 is attached to the grill grate 600 at a depth where the grease trap body can receive drippings from the grill grate 600. The stops 908 can be bends inward at ends of hooks 906 that contact the end of the grill grate 600 to prevent movement past a point where the grease trap body 902 is located below openings 614 of the grill grate 600.

In embodiments, grease traps similar to grease trap 900 can be configured such that the grease trap can be attached to a grill grate having a structure such as the grates for round grills, such as, as non-limiting examples, the grill grates shown in FIGS. 2 and 7 and described above. In those embodiments, the shape of grease trap 900 and retention arms 904 can be suitably modified to retain grease trap 900 to the grill grate with the grease trap body located below openings in grease channels of the grill grate.

Figure 10:
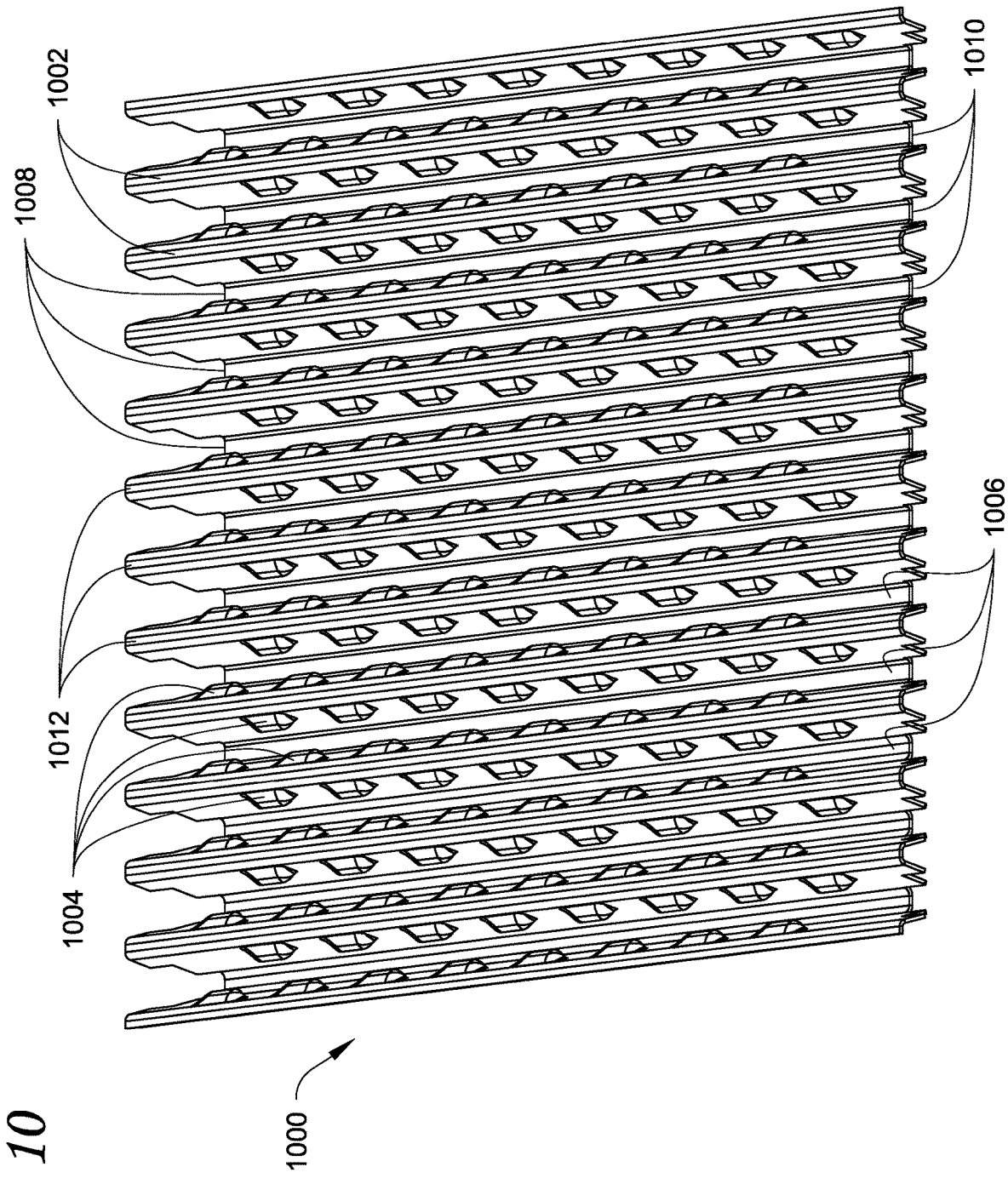
FIG. 10 shows a grill grate according to an embodiment.

FIG. 10 shows a grill grate and grease drain according to an embodiment. Grill grate 1000 includes flavor bars 1002, dormers 1004 provided on the side walls of flavor bars 1002, and grease channels 1006. The flavor bars 1002 and the dormers 1004 can be structured and arranged as with any other flavor bars and dormers described herein. The grease channels 1006 include open ends 1008 and 1010. In embodiments, one of the open ends 1008 or 1010 can instead be closed by and end wall, such as the first end wall 608 or the second end wall 610 described above and shown in FIG. 6. In an embodiment, the grease channels 1006 can be sloped towards one of the open ends 1008 or 1010. A grease trap, such as grease trap assembly 800 or grease trap 900 can be configured to be used with grill grate 1000, for example by being configured such that the grease trap 810 or the grease trap body 902 is located below where the grease channels 1006 reach the open ends 1008 and 1010. The flavor bars 1002 can include extensions 1012 configured to support the grill grate within a grill, for example by resting on a flange of the grill or the support flange 806 of grease trap assembly 800. In embodiments, the respective lengths of the flavor bars 1002 and the grease channels 1006 can be such that the grill grate 1000 is configured for use in grills of a particular shape, such as having the respective lengths shown in FIG. 7 and described above in order to be configured for use with a round grill.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A grill grate, comprising:
 a plurality of flavor bars; and
 one or more grease channels disposed between flavor bars of the plurality of flavor bars, the one or more grease channels each connected to a side wall of at least one of the plurality of flavor bars;
 wherein:
 each of the plurality of flavor bars includes a plurality of dormers formed on at least one of the side walls of the respective flavor bar,
 each dormer projecting outwards from the respective side wall of the respective flavor bar, each dormer including an opening,
 each dormer having sloped walls surrounding the respective opening, the sloped walls configured to direct drippings around the opening towards the grease channels, and
 the grease channels form at least a portion of one or more basins configured to receive the drippings.

2. The grill grate of claim 1, wherein each of the openings faces towards one of the one or more grease channels.

3. The grill grate of claim 1, wherein each of the grease channels is closed at a first end by a first end wall and each of the grease channels is closed at a second end, opposite the first end, by a second end wall, and each of the grease channels forms one of the one or more basins.

4. The grill grate of claim 1, wherein each of the openings is trapezoidal in shape.

5. The grill grate of claim 1, wherein the grill grate comprises stainless steel.

6. The grill grate of claim 1, wherein each of the plurality of flavor bars includes a relief opening at each end of said flavor bar.

7. The grill grate of claim 1, wherein the dormers of one of the plurality of flavor bars are offset along the length of the flavor bar from a position of the dormers of each adjacent flavor bar of the plurality of flavor bars.

8. The grill grate of claim 1, wherein the one or more basins each include one or more drain openings configured to allow flow out of said basin.

9. The grill grate of claim 8, further comprising a grease trap, the grease trap configured to be located below the one or more drain openings.

10. The grill grate of claim 8, wherein the one or more drain openings are provided at an end of each of the one or more grease channels.

11. A grill, including the grill grate of claim 1.

12. A method of manufacturing the grill grate of claim 1, comprising:
 providing a metal sheet including a plurality of flanges spaced apart from one another along the perimeter of the metal sheet; and
 stamping the metal sheet to form the flavor bars and the dormers.

13. The method of claim 12, further comprising welding at least two of the plurality of flanges together.

14. The method of manufacturing of claim 12, wherein each of the plurality of flanges includes a tab configured to extend over another of the plurality of flanges after the metal sheet has been formed.

15. The method of manufacturing of claim 14 wherein the grill grate is cast aluminum.

16. The method of manufacturing of claim 12, further comprising coating the grill grate with a non-stick coating.

17. A method of manufacturing the grill grate of claim 1, comprising casting the grill grate.

* * * * *